(12) United States Patent
Buelow, II et al.

(10) Patent No.: US 6,304,693 B1
(45) Date of Patent: Oct. 16, 2001

(54) EFFICIENT ARRANGEMENT FOR COUPLING LIGHT BETWEEN LIGHT SOURCE AND LIGHT GUIDE

(75) Inventors: Roger F. Buelow, II, Cleveland Heights; John M. Davenport, Lyndhurst; Juris Sulcs, Chagrin Falls, all of OH (US)

(73) Assignee: Fiberstars Incorporated, Fremont, CA (US)

( * ) Notice: Subject to any disclaimer, the term of this patent is extended or adjusted under 35 U.S.C. 154(b) by 0 days.

(21) Appl. No.: 09/454,073

(22) Filed: Dec. 2, 1999

(51) Int. Cl.$^7$ ................. G02B 6/26; G02B 6/42
(52) U.S. Cl. ................. 385/31; 385/34; 385/43; 385/901; 362/298; 362/302; 362/346
(58) Field of Search ................. 385/31, 34, 43, 385/88, 92, 146, 901; 362/26, 298, 302, 346, 551, 581

(56) References Cited

U.S. PATENT DOCUMENTS

| | | |
|---|---|---|
| 5,058,985 | 10/1991 | Davenport et al. . |
| 5,271,077 | * 12/1993 | Brockman ................. 385/31 |
| 5,390,265 | * 2/1995 | Jiao ................. 385/15 |
| 5,406,462 | * 4/1995 | Fallahi ................. 362/32 |
| 5,587,626 | 12/1996 | Parham et al. . |
| 5,675,677 | 10/1997 | Davenport et al. . |
| 5,676,579 | 10/1997 | Parham et al. . |
| 5,692,091 | * 11/1997 | Cassarly ................. 385/31 |
| 5,791,756 | 8/1998 | Hulse et al. . |
| 5,812,714 | 9/1998 | Hulse . |
| 5,826,963 | 10/1998 | Cassarly et al. . |
| 6,123,436 | * 9/2000 | Hough ................. 385/146 |

OTHER PUBLICATIONS

Cassarly et al., "Comparison of Dual Focus Collector Schemes for Fiber Systems," SAE Paper No. 970254, presented at the Feb. 1997 SAE congress, pp. 1–10.
W.T. Welford and R. Winston, High Collection Nonimaging Optics, New York: Academic Press, Inc. (1989), chapter 4(pp. 53–76).

* cited by examiner

*Primary Examiner*—Cassandra Spyrou
*Assistant Examiner*—Leo Boutsikaris
(74) *Attorney, Agent, or Firm*—Charles E. Bruzga

(57) ABSTRACT

An efficient arrangement for coupling light between a light source and at least one light guide comprises a light source having a bulbous region and electrical in-leads extending into the bulbous region. A generally tubular, hollow coupling device with an interior light-reflective surface receives light from the source at an inlet and transmits it to an outlet. The coupling device increases in cross sectional area from inlet to outlet in such manner as to reduce the angle of light reflected from the surface as it passes through the device. A thermal-isolating region has an inlet positioned in proximity to an outlet of the coupling device and has an outlet for passing light to an optical member. The thermal-isolating region comprises one or more members. The foregoing can achieve high efficiency and considerable compactness while using a non-"point-like" light source.

48 Claims, 8 Drawing Sheets

EFFICIENT ARRANGEMENT FOR COUPLING LIGHT BETWEEN LIGHT SOURCE AND LIGHT GUIDE

FIELD OF THE INVENTION

The present invention relates to an optical arrangement for coupling light from a light source to a light guide.

BACKGROUND OF THE INVENTION

The present invention relates to arrangements for coupling light at high efficiency between a light source and one or more light guides or optical fibers. An article by Cassarly et al., "Comparison of Dual Focus Collector Schemes for Fiber Systems," SAE Paper No. 970254, presented at the February 1997 SAE Congress, surveys arrangements for efficiently coupling light from a high brightness light source, such as an instant light, metal halide high pressure discharge lamp to light guides or optical fibers. In several of the embodiments discussed, elliptical reflectors focus light into light guides. The light guides or fibers receive light at their input ends within an angular distribution that can efficiently be transmitted through the light guide or fiber. As used herein, angles of light are measured with respect to the main direction of light propagation. The arrangements work by placing the light source at the first focus of an elliptical reflector and placing the collection optics at the second focus. The desirability of such systems are strongly dependent on the availability of high brightness, short arc (e.g., 2.7 mm), light sources. With "point-like" light sources, these systems can be made quite compact.

It would, however, be desirable to provide an efficient and compact light coupling arrangement for arc sources with longer arc gaps (e.g., 7 mm) that are not as "point-like" by employing non-focusing optical elements to achieve the reduction in the angular distribution of light transmitted from the light source to the extent desirable for efficient collection and transmission by a light guide or fiber. It would also be desirable if embodiments of light coupling arrangements using such different optical elements could be manufactured more easily and at lower costs than embodiments using elliptical (or other focusing) collectors.

SUMMARY OF THE INVENTION

An exemplary embodiment of the invention comprises an efficient arrangement for coupling light between a light source and at least one light guide. The arrangement comprises a light source having a bulbous region and electrical in-leads extending into the bulbous region. A generally tubular, hollow coupling device with an interior light-reflective surface receives light from the source at an inlet and transmits it to an outlet. The coupling device increases in cross sectional area from inlet to outlet in such manner as to reduce the angle of light reflected from the surface as it passes through the device. A thermal-isolating region has an inlet positioned in proximity to an outlet of the coupling device and has an outlet for passing light to an optical member. The thermal-isolating region comprises one or more members.

The foregoing arrangement can achieve high efficiency and considerable compactness while using a non-"point-like" light source.

DETAILED DESCRIPTION OF THE INVENTION

Figure 1:
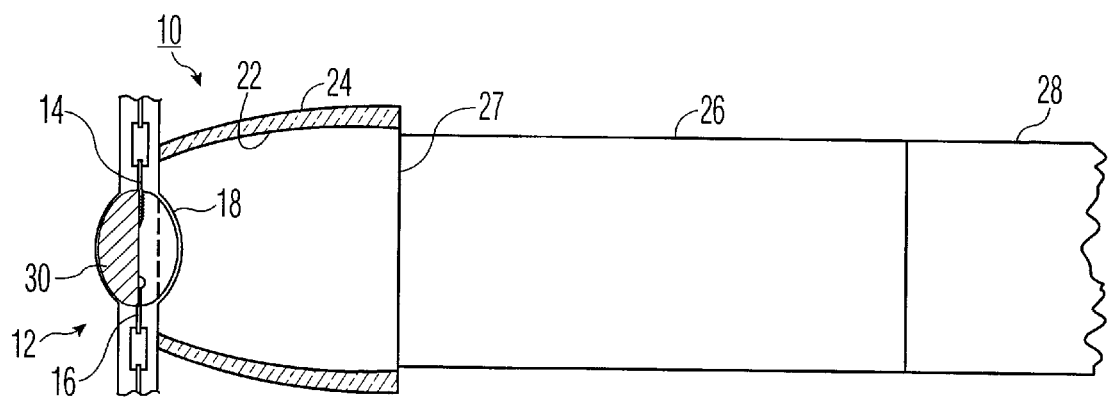
FIG. 1 is a simplified side plan view of a light coupling arrangement in accordance with the present invention, partially in cross section.

FIG. 1 shows a light coupling arrangement in simplified form. An arc lamp 12 includes electrical in-leads 14 and 16 terminating in spaced electrodes within an arc chamber 18.

The lamp is preferably powered by D.C. voltage, to allow for a compact power supply. Lamp 12 is preferably oriented generally vertically and transverse to the direction of light propagation, as shown, with upper electrode associated with in-lead 14 being the cathode. The interior surface 22 of a coupling device 24 of a refractory material such as quartz, ceramic or other vitreous material such as high temperature borosilicate glass, for instance, is reflective to light. In referring to a coupling device, "refractory" means that the device will not be degraded by the heat from the lamp, nor will the heated coupling device degrade the lamp. Surface 22 may comprise a multi-layer optical interference coating or a metallic reflective coating, for instance, to impart reflectivity. Light transmitted through coupling device 24 passes through a thermal-isolating region 26 before being passed to a light guide 28. An input 27 of thermal-isolating region 26 preferably includes one or more coatings (not shown) to prevent propagation of either or both infrared and ultraviolet light. Where region 26 is hollow, a separate filter (not shown) can be used to block one or both infrared and ultraviolet light to protect the light guide. Region 26 thermally isolates light guide 28, which typically comprises non-refractory plastic material or glass, from lamp 12.

In the embodiment shown, a reflective member 30, shown cross-hatched, directs light from the left-hand side of lamp 12 into coupling device 24. This allows for a high amount of light to be transmitted to light guide 28.

Arc lamp 12 preferably comprises a conventional metal halide arc lamp with a longer arc gap than lamps producing a "point-like" light source, e.g., a 7 mm arc gap as opposed to a 2.7 mm arc gap. Length-to-width ratios of the resulting arcs are typically 8:1 for the longer gap as opposed to the range from about 1:1 to about 2:1 for the shorter gap. The longer gap results in: (1) greater efficiency in terms of lumens per watt; (2) lower loading on the wall of chamber 18 in terms of flux per unit area and lower pressure, so that the bulb wall can be thinner and lamp life longer; (3) less sensitive manufacturing tolerances, such as arc bulb thickness and arc gap length, resulting in lower cost; and (4) lower current, resulting in lower-cost wiring.

In FIG. 1, the interior of coupling device 24 increases in cross sectional area from an inlet at the left to an outlet at the right in such manner as to reduce the angle of light reflected from its interior reflective surface 22 as it passes through the device. Preferred shapes of the interior of coupling device are described below.

Figure 2:
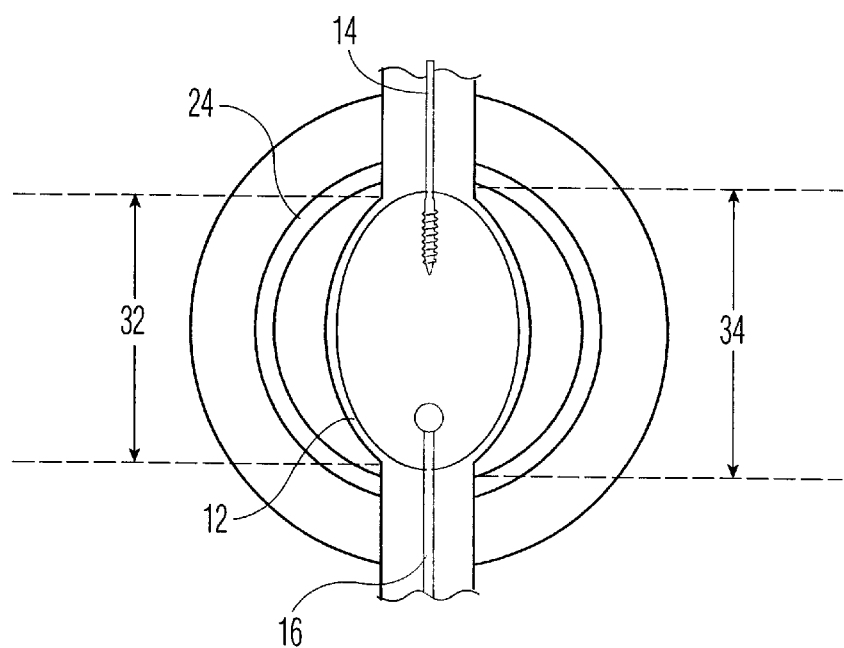
FIG. 2 is a side plan view of lamp 12 and the nearby end of coupling device 24 of FIG. 1.
Figure 3:
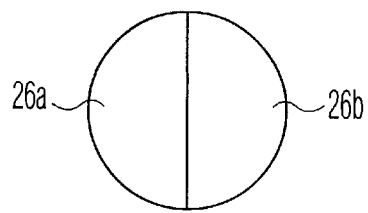
FIG. 3 is an end plan view of thermal-isolating region 26 of FIG. 1.

FIG. 2 shows a preferred relation between the length 32 of the bulbous region of arc chamber 18 and the maximum dimension 34 of the nearby inlet of coupling device 24. Preferably dimension 32 is more than about 50% of dimension 34, and preferably upwards of 85%, for efficient utilization of the light generated by the lamp. This enables the bulbous region to fill a large part of the input to the coupling device. As a result, the inlet can be kept small and the outlet, which is typically proportional to the input, can be kept small. Compactness results. By "bulbous" portion is meant an enlarged portion that could be substantially elliptical, spherical or cylindrical or otherwise enlarged.

Figure 4:
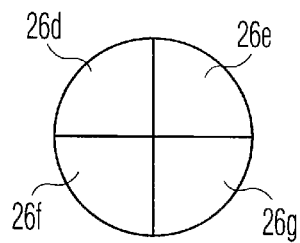
FIG. 4 is an end plan view of another thermal-isolating region 26 of FIG. 1.

Thermal-isolating region 26 may comprise a single device, or it may comprise multiple submembers such as 26a and 26b shown in FIG. 3 or 26d–26g shown in FIG. 4. Region 26 or any of its submembers could be hollow if desired. Quartz may be used for region 26, although other refractory materials that can withstand the heat from lamp 12 without degrading the lamp or light guide can be used, such as high temperature borosilicate glass.

The largest dimension of the input of thermal-isolating region 26 (FIG. 1), which is measured transverse to the central axis of light propagation, is preferably more than about 50 percent of the maximum dimension of the outlet of coupling device 24, also measured transverse to same direction. Such percentage preferably approaches 100 percent or exceeds 100 percent to provide tolerance in aligning device 24 and region 26. In this manner, region 26 can capture substantially all the light emanating from the outlet of device 24, which contains diverging or non-focussed light. Region 26 prevents further divergence of the light. For the same reason, the inlet of region 26 is preferably positioned in the immediate vicinity of the outlet of device 24.

Figure 5:
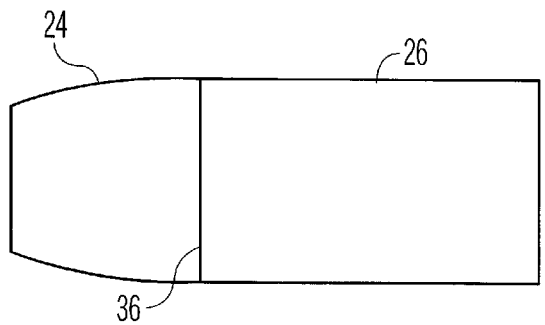
FIG. 5 is a simplified side plan view of coupling device 24 and thermal-isolating region 26 of FIG. 1.

As shown in FIG. 5, member 26 may alternatively comprise an extension of coupling device 24 whose cross section in the direction of light propagation may be substantially constant, as opposed to the changing cross section of device 24 to the left of boundary 36.

Light guide 28 (FIG. 1) may comprise one or more individual light guides, and may be conventional per se.

Figure 6:
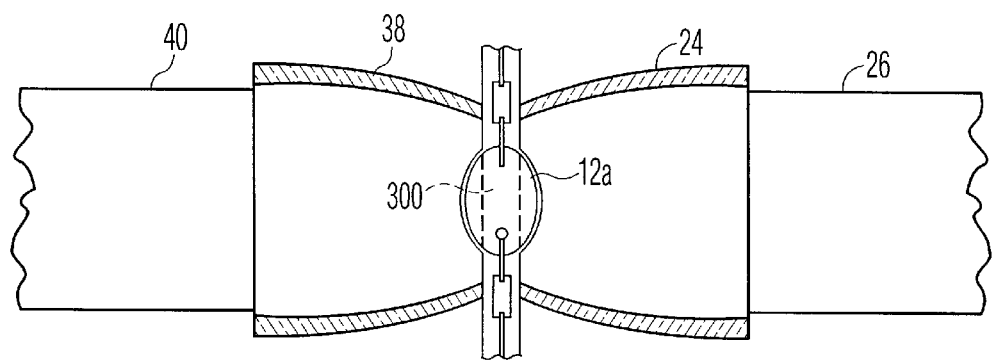
FIG. 6 is a simplified side plan view of a light coupling arrangement similar to that shown in FIG. 1, for outputting light from a lamp in two different directions, partially in cross section.

FIG. 6 shows a light coupling arrangement using the same coupling device 24 and thermal-isolating region 26 as shown in FIG. 1, and additionally includes another coupling device 38 and another thermal-isolating region 40. Device 38 and region 40 may respectively be substantially alike device 24 and region 26 described above. In this embodiment, lamp 12a does not include a reflective member such as 30 associated with lamp 12 of FIG. 1, so that light exits lamp 12a on both its right and left sides.

Figure 7:
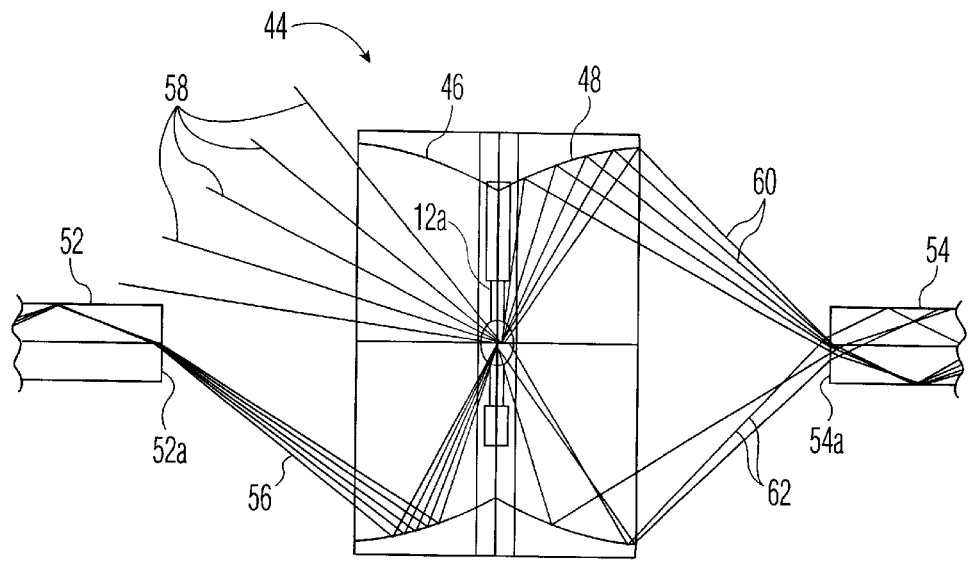
FIG. 7 is a simplified side plan view of a prior art light coupling arrangement showing tracings of light rays.

FIG. 7 shows a prior art light coupling arrangement 44 employing back-to-back elliptical mirrors for directing light from a lamp 12a to light guides 52 and 54. Mirror 46 focuses light rays 56 from the lamp onto a focal point at the inlet 52a of light guide 52. Light rays 58, not reflected from mirror 46, are wasted. Mirror 48 similarly focuses light rays 60 and 62 onto inlet 54a of light guide 54. Mirrors 46 and 48 are large in relation to the arc gap of lamp 12a, typically in a ratio of 10:1 to 12:1.

Figure 8:
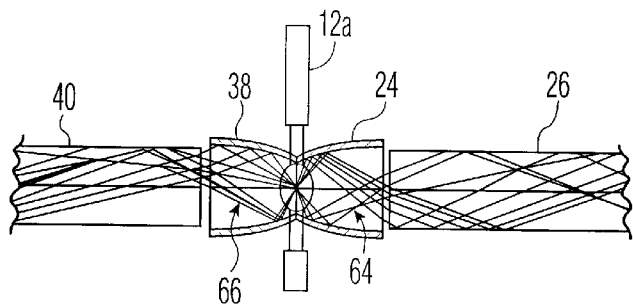
FIG. 8 is a simplified side plan view of the light coupling arrangement of FIG. 6 showing tracings of light rays.

FIG. 8, showing the inventive arrangement of FIG. 6, contrasts with prior art FIG. 7. Thus, light rays 64 leaving the outlet of coupling device 24 after being reflected on the internal surface of the device constitute non-focused rays. The same is true for light rays 66 leaving the outlet of coupling device 38 after being reflected on the internal surface of the device. This contrasts with the focussed light reflected from the elliptical reflectors 46 and 48 of the prior art arrangement of FIG. 7. Coupling devices 24 and 38 capture light rays 64 and 66 without wastage corresponding to wasted light rays 58 in FIG. 7.

Figure 10A:
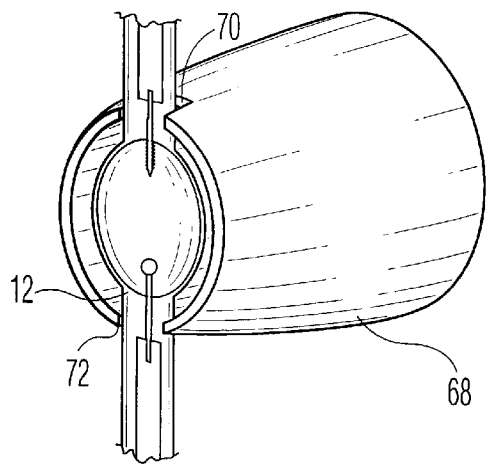
FIG. 10A is a perspective view of the coupling device of FIG. 9 and a lamp arranged to fit within recesses of the device.

FIGS. 7 and 8 are approximately to scale, have the same size light-receiving members (e.g., 52, FIGS. 7; 40, FIG. 8), and use the same 68-watt metal halide lamp with an 98 mm arc gap, as shown below in FIG. 10A. Thus, a comparison of FIGS. 7 and 8 illustrates the relative compactness of the inventive arrangement.

Figure 9:
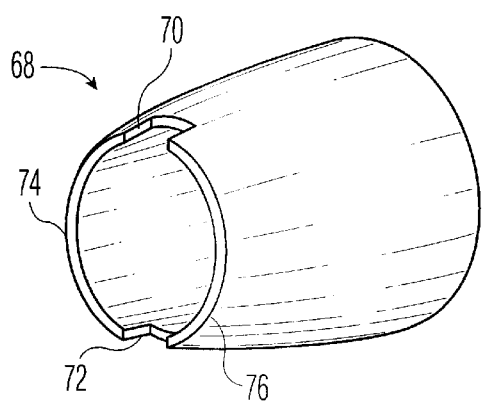
FIG. 9 is a perspective view of a preferred coupling device used in the inventive arrangement.

FIG. 9 shows a coupling device 68 including a pair of recesses 70 and 72 at the inlet to the device. The recesses preferably allow positioning of a lamp so that its arc gap, or more broadly, a generally linear light-emitting region (not shown), can be approximately located in an inlet plane in which inlet edges 74 and 76 lie. This also allows the bulbous region (not shown) of the arc chamber of the lamp to extend more than about 50 percent, and preferably upwards of 85 percent, of the maximum opening of the inlet. FIG. 10A shows a lamp 12 preferably positioned with respect to coupling device 68 to have approximately ½ of its opposite ends respectively received in recesses 70 and 72. The recesses also facilitate alignment of the lamp within the coupling device.

Figure 10B:
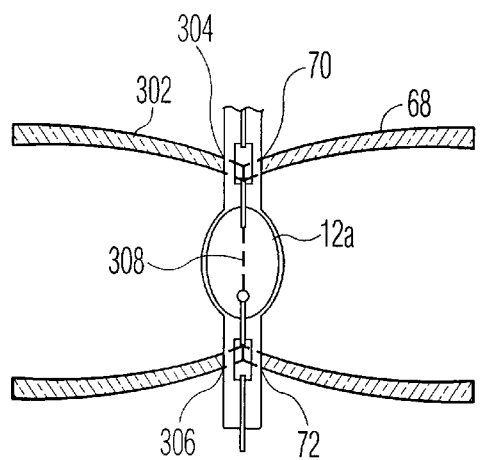
FIG. 10B is similar to FIG. 6 but shows coupling devices including recesses for receiving opposite ends of a lamp.

FIG. 10B shows coupling device 68 with recesses 70 and 72 and coupling device 302 with recesses 304 and 306. Lamp 12a is received into recesses 70 and 72 on its right side and into recesses 304 and 306 on its left side, each recess preferably receiving approximately ½ of an end of the lamp. Since the coupling devices can substantially abut each other at boundary 308, there is no opening comparable to opening 300 in FIG. 6 through which light can escape. As a result, the FIG. 10B arrangement can extract substantially more light than 20 the FIG. 6 arrangement.

Figure 10C:
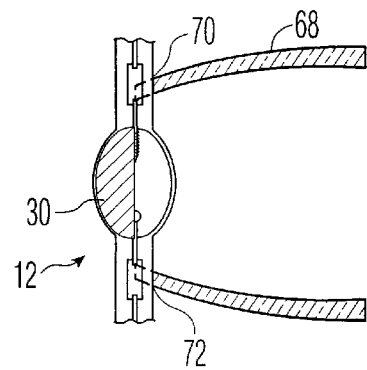
FIG. 10C is similar to FIG. 1 but shows a coupling device including recesses for receiving opposite ends of a lamp.

FIG. 10C shows a lamp 12 received within recesses 70 and 72 of coupling device 68, and having a reflective member 30, as in FIG. 1, for directing light to the right into the coupling device.

Figure 11:
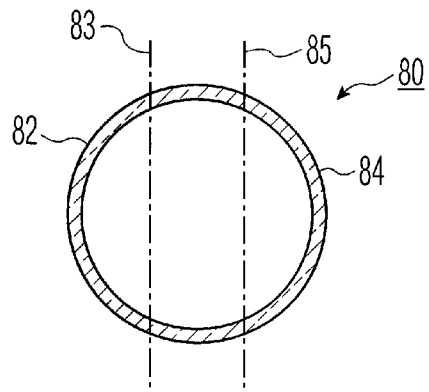
FIG. 11 is a simplified view of a cross section of a structure used conceptually to form a preferred coupling device, taken along the central axis of light propagation.

Apart from, or in combination with, recesses 70 and 72 or 302 and 306 in the coupling device of FIGS. 9, 10A, 10B and 10C, the cross section the coupling device along the central axis of light propagation may be circular, or for typically more efficient light extraction, non-circular. Preferably, the cross sectional shape of an inlet of a coupling device generally conforms to the shape of a bulbous region of a lamp. FIG. 11 shows how a preferred cross section may be achieved.

In FIG. 11 a structure 80 of quartz, for instance, has a circular cross section as shown. Equal-degree arcs 82 and 84, each less than 180 degrees, are respectively delineated by lines 83 and 85. Arcs 82 and 84 together form a clamshell-like structure 88 shown in FIG. 12, which is oblong. A lamp (not shown) is preferably aligned with main, or longer, axis 90. If recesses are included, they are also preferably aligned with the main axis. For coupling devices having circular cross sections along the central axis of light propagation, the interior (reflecting) surface of the device preferably has the shape of a compound parabolic concentrator (CPC). Structure 80 of FIG. 11, used in forming device 88 of FIG. 12, preferably has the shape of a CPC.

Figure 12:
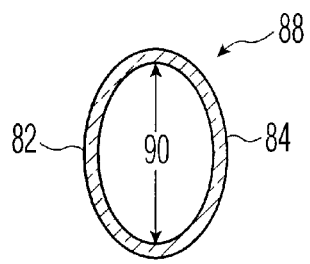
FIG. 12 is a simplified view of a cross section of a preferred cross sectional shape of a completed coupling device, taken along the central axis of light propagation.

FIGS. 11 and 12 conceptually show how a non-circular cross-sectioned coupling device made be made. However, both circular and non-circular cross-sectioned coupling devices are preferably made by casting or molding. By way of example, a coupling device can be formed by casting when made of ceramic.

By way of further example, when a coupling device is made of quartz or other vitreous material, it can be formed by blow molding in a similar way as a quartz arc tube with a bulbous region (not shown) along a main axis of the arc tube. The bulbous region typically has a maximum diameter at its midpoint along the axis, and tapers in diameter towards both of its axial ends. A respective coupling device can be cut from each tapered section, with its interior made reflective.

For either circular or non-circular cross-sectioned devices, an outwardly extending ridge (not shown) preferably extends around the bulbous region at the midpoint to facilitate alignment of a cutting instrument and to reduce the chance of fracturing the bulbous region during cutting. The ridge can be formed by applying a narrow zone of heat to the region in a special gathering step.

Reference can generally be made to prior art techniques for making arc tubes for forming a structure similar to an arc tube with a bulbous region. Additionally, manufacturing tolerances should be kept especially low to substantially achieve an optically desired shape. This can be done, for instance, by maintaining an accurate mold shape, accurately centering a tube of quartz, etc., and accurately positioning the mold on the tube. These measures will be routine to those of ordinary skill in the art from the present specification.

A special consideration arises when making devices with non-circular (e.g., oblong) cross sections along the central axis of light propagation. Since a mold directly shapes only the exterior of the device whereas only the interior surface is used for reflection, the bulbous region is varied in thickness to result in a desired interior surface topology.

When forming coupling devices from the foregoing molding process, the thickness of the device wall will typically be greater at its inlet than at its outlet.

Figure 13:
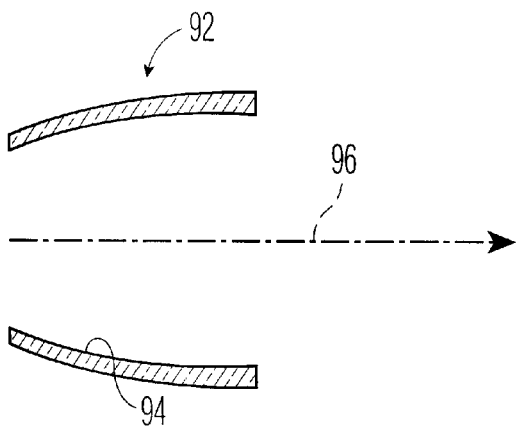
FIG. 13 is a simplified cross sectional view of a coupling device and the central axis of light propagations.

FIG. 13 shows a cross section of a coupling device 92 taken along the central axis of light propagation 96. It is preferred that substantially all cross-sectional segments along the interior of coupling device 92 taken through the central axis of light propagation be substantially parabolic, or substantially conform to a CPC shape. CPC is a specific form of an angle-to-area converter, as described in detail in, for instance, W. T. Welford and R. Winston, High Collection Nonimaging Optics, New York: Academic Press, Inc. (1989), chapter 4 (pp. 53–76).

Figure 14:
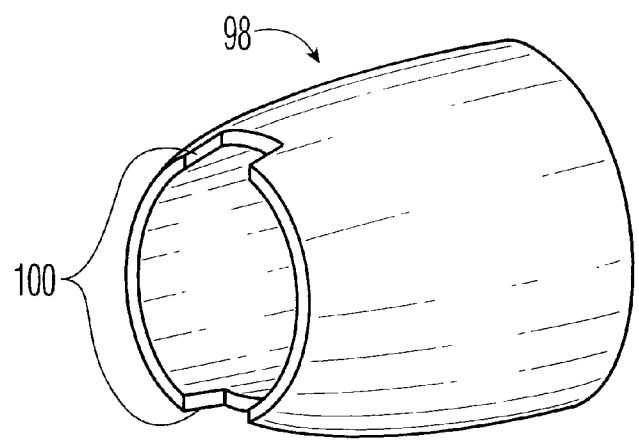
FIG. 14 is a perspective view of another coupling device in accordance with another embodiment.
Figure 15:
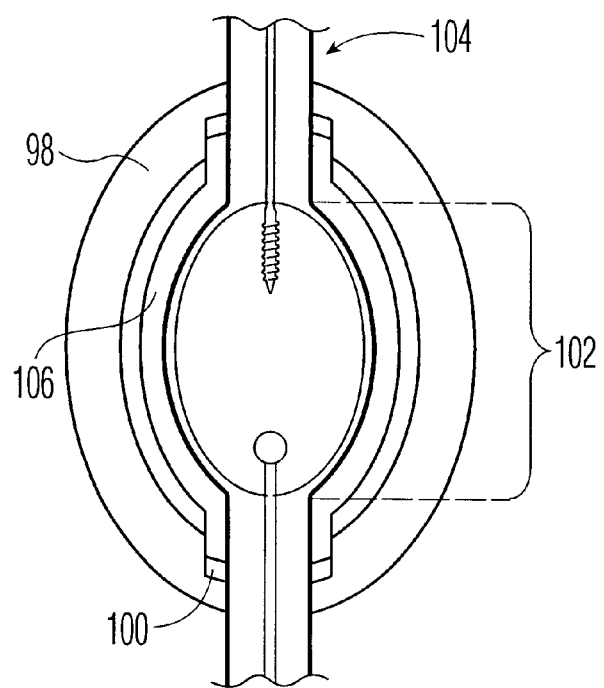
FIG. 15 is a side plan view of a lamp received within the coupling device of FIG. 14.

FIG. 14 shows a coupling device 98 whose cross section along a central axis of light propagation is oblong, and which includes recesses 100 functioning in the manner of recesses 70 and 72 described above with respect to FIG. 9. As can be seen in FIG. 15, this allows the bulbous region 102 of a lamp 104 to substantially fill the inlet 106 of coupling device 98. This results in high efficiency in extracting light from the lamp.

Figure 16:
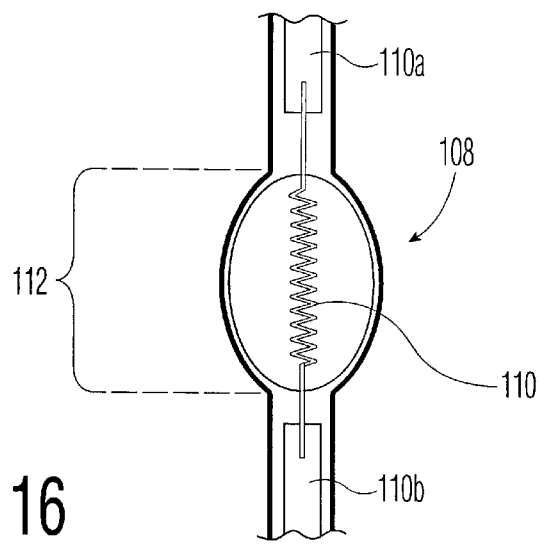
FIG. 16 is a side plan view of a filamented lamp suitable for use in various embodiments.

FIG. 16 shows a filamented lamp 108 that may be used instead of the arc lamps described above. The lamp includes a filament 110 within a bulbous region 112 of the lamp. Filament 110 is supplied by electrical in-leads 110a and 110b passing into the bulbous region. Both the filament 110, as well as the arc lamps described above, are considered to have a generally linear light-emitting region. Typically, the bulbous region is substantially elliptical, as is also typical for the arc lamps described above. Lamp 108 may be a halogen lamp, for instance. It is believed that prior art arrangements for coupling light from typically elongated filament-type lamps are not very efficient, a problem addressed by the present invention.

Figure 17:
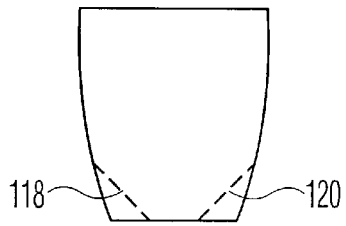
FIG. 17 is a top plan view of a coupling device prior to a trimming operation for placing multiple coupling devices around a single light source.

FIG. 17 shows a coupling device 116 before trimming away portions 118 and 120 marked by dashed lines. Coupling device 116 may be placed in the four-coupler configuration of FIG. 18.

Figure 18:
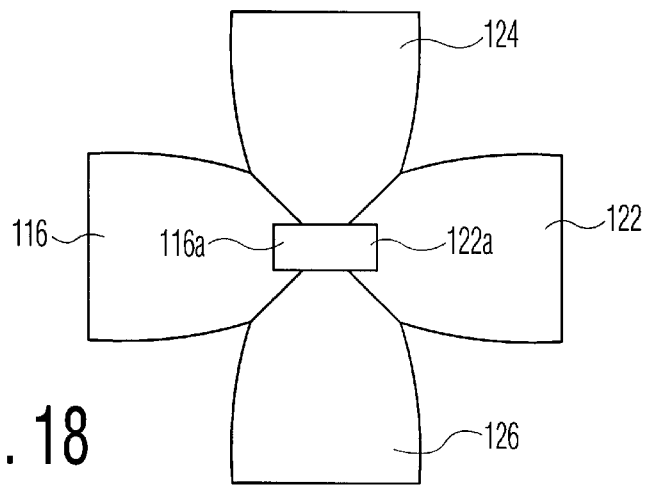
FIG. 18 is a top plan view of a four-coupler arrangement employing the coupler of FIG. 17.
Figure 19:
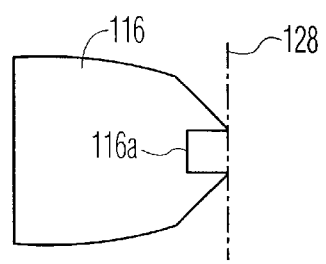
FIG. 19 is a top plan view of the coupler of FIG. 17 showing an inlet plane.

FIG. 18 shows coupler 116 and coupler 122 that is preferably a mirror image of coupler 116. Another pair of couplers 124 and 126, preferably a mirror image of each other, are included. Each coupler preferably has the same basic inlet shape as coupler 116. Additionally, an inlet of coupler 116 includes a recess 116a extending in the direction of light propagation, and an inlet of coupler 122 includes a similar recess 122a. Together, recesses 116a and 122a both position and support opposite ends of an electroded light source (not shown). Referring also to FIG. 19, the recesses position a generally linear light-emitting region of the light source (not shown) approximately in a plane (e.g., 128) of an inlet of coupler 116.

Figure 20:
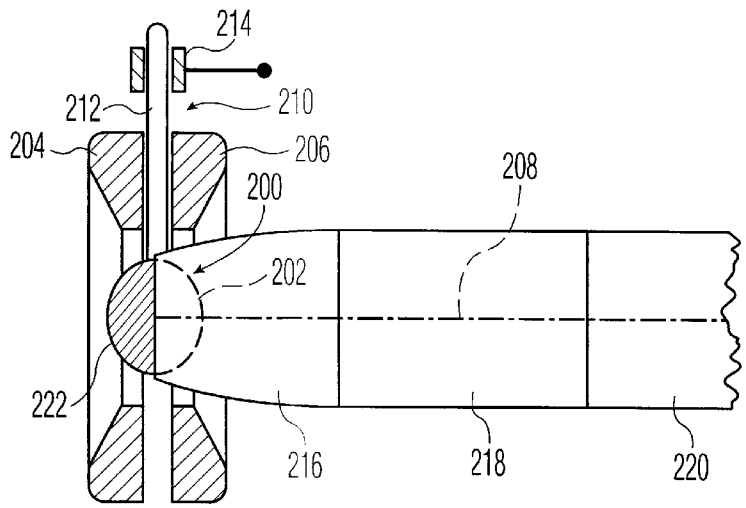
FIG. 20 is a side plan view of an arrangement for coupling light from an electrodeless lamp to one or more light guides in accordance with another embodiment, partially in cross section and partially away.

FIG. 20 shows an electrodeless lamp 200 in which a generally toroidal (or doughnut) shaped arc discharge (not shown) is created in an arc discharge chamber 202. The arc results from electrical excitation from an electrical excitation circuit including turns 204 and 206 of an electrical coil.

The arc is axially aligned with a central axis 208 of light propagation. A starting aid 210 may include a so-called gas probe 212 passing between turns 204 and 206, and a capacitively coupled sleeve 214 for activating the starting aid. Lamp 200 and coil turns 204 and 206 may be conventional per se.

Figure 21:
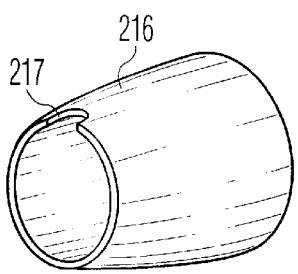
FIG. 21 is a perspective view of a light coupling device useful in the arrangement of FIG. 20.

As shown in FIG. 21, coupling device 216 includes a recess 217 in which a portion of probe 212 is situated for aligning and supporting the lamp. A structural member (not shown) without an electrical function could instead be partially received in recess 217.

In FIG. 21, a coupling device 216 couples light from lamp 200 to one or more light guides 220 via a thermal-isolating region 218. Device 216 and region 218 correspond to the description or like-named parts above. In particular, region 218 thermally isolates light guide 220 from lamp 200. A reflective member 222, e.g., a multi-layer optical interference coating, reflects leftward-directed light from the arc even along central axis 208 into the coupling device.

Figure 22:
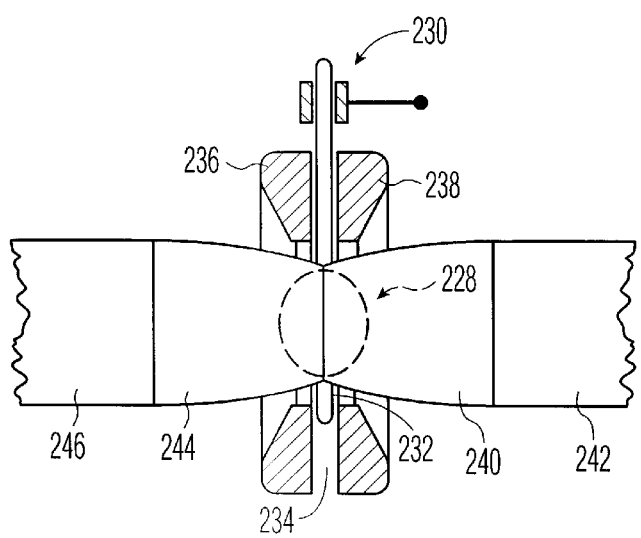
FIG. 22 is a side plan view of another embodiment using a electrodeless lamp, partially in cross section.

FIG. 22 shows an electrodeless lamp 228 with starting aid 230 similar to aid 214 (FIG. 20), and another member 232 protruding from the lamp. Aid 230 and member 232 extend from opposite sides of the lamp, and extend towards or into the space 234 between adjacent turns 236 and 238 of an excitation coil.

Light from lamp 228 is preferably extracted from both right-shown and left-shown sides of the lamp. Thus, light passes to the right through coupling device 240 and thermal-isolating region 242, and passes to the left through coupling device 244 and thermal-isolating region 246. These parts correspond to the like-named parts in FIG. 20.

Figure 23:
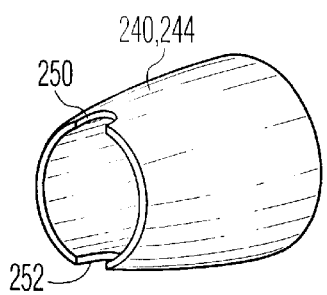
FIG. 23 is a perspective view of a light coupling device useful in the arrangement of FIG. 22.

FIG. 23 shows an inlet end of coupling device 240 or 244, which may be substantially alike. The device includes a pair of recesses 250 and 252 extending into the device from the inlet end, in the direction of light propagation. Recesses 250 and 252 receive respective portions of starting aid 230 and member 232 for aligning the lamp between coupling devices 240 and 244. Member 232 need not perform an electrical function. Further, another member (not shown) without electrical function can replace starting aid 230, in which case another form of starting aid can be employed.

Additionally, device 244 need not perform an optical function, but can be used instead for positioning lamp 228. In this case, lamp 228 would incorporate a reflective member such as 222 in FIG. 20 for directing the light into only coupling device 240.

Example—Coupling Device of FIGS. 1, 2, 9 and 10A–10C

The round cross-section coupling devices as seen in FIGS. 1, 2, 9 and 10A–10C were designed using the rules detailed in the above-cited Welford & Winston reference. The input side of this coupling device is limited by the size of the arc chamber of the lamp, FIG. 2. A 68-watt DC arc lamp used with this coupling device has an oblong or egg shaped arc chamber, with a length of 13 mm and a maximum diameter of 9 mm with an arc of approximately 8 mm long and 1 mm in diameter. In order for the arc chamber to fill the input of the device, recesses need to be cut into the input face to accommodate the longitudinal ends of the lamp (FIGS. 9 and 10) and the arc chamber input diameter must be at least 13 mm.

The device length, output diameter, and curve are determined by the input diameter, the desired output angle, and the expected input angle. A preferred rule to find the output size is: $\mathrm{Sin}^2(\text{Input Angle}) * \text{Input Area} = \mathrm{Sin}^2(\text{Output Angle}) * \text{Output Area}$.

In a specific case, concern is for Input Angles of near 90°, so Sin(Input Angle) is approximately 1. The input area is a 13.25 mm diameter circle as to accept the long axis of the lamp. Experiments showed that the specific light guide was most effective for light striking its face at an angle of 38 degrees in air or less. Thus, the device was designed to give an output angle of, at most, 38 degrees. These inputs determine an output area of 364 mm$^2$, or a circle of 22 mm diameter.

As described in the above-cited Winston and Welford reference, the length is determined by the output angle, input diameter and output diameter. In the specific case discussed above, a 38 degree coupling device with a 13 mm diameter input and a 22 mm diameter output needs to be 22 mm long. The curve followed by the interior of the circular cross-sectioned device follows that described in the Winston and Welford reference and is uniquely defined by the desired output angle and the input diameter of 13.25 mm.

Example—Coupling Device of FIGS. 12, 14 & 16

This circular cross section coupling device provides good results, but because only a portion of the output is received by the thermal isolating device, e.g., a quartz rod, a design which has a smaller output area while giving the same or better angular transformation would be more efficient.

In order to decrease the output area without harming the angular transformation, the input area must be decreased. This is not possible with a circular cross-sectioned device, but is possible with a modified angle to area converter with an oblong cross section that more closely matches the shape of the arc chamber.

One way to make an oblong cross section is to bring together two segments of less than 180 degrees. If two 142° segments of a 14 mm diameter circle are brought together, the resulting shape is 13.25 mm tall by 9.5 mm wide, large enough to accept the 68-watt DC arc lamp.

The shape of the oblong angle to area converter was constructed by first designing a device with a 14 mm input and a 38 degree output. This shape was then sectioned and replicated such that the input was the union of two 142° segments of the 14 mm input circle.

In order to make sure that the angular conversion of the device was at most 38 degrees, the angle of the segment of each section was increased as the diameter increased. This translates to greater area and therefore conversion to even lower angles.

The output of the oblong angle to area converter is the union of two 156° segments of a 22.8 mm diameter circle. The oblong angle to area converter device works in much the same manner as a device defining a compound parabolic concentrator (CPC). The shape of each of the two sections follows the equations for a CPC as described by the above-cited Winston and Welford reference except for the location of the optical axis. The majority of the light (e.g., more than 75%) reflects off of a wall only once.

For these single reflection rays, the oblong converter acts exactly as it would in the case of a true CPC that the section emulates. The oblong angle to area converter gives increased efficiency over the true CPC because:

1. The ratio of output area to input area is greater in the oblong converter described here, resulting in light converted to lower angles;
2. The output area of the CPC is 15% larger than the oblong converters. Since our thermal isolator collects only a set area of the output, and this area is a greater percentage of the smaller oblong converter, the isolator therefore collects more light.

While the invention has been described with respect to specific embodiments by way of illustration, many modifications and changes will occur to those skilled in the art. It is, therefore, to be understood that the appended claims are intended to cover all such modifications and changes as fall within the true scope and spirit of the invention.

What is claimed is:

1. An efficient arrangement for coupling light between a light source and at least one light guide, comprising:
   a) a light source having a bulbous region;
   b) a generally tubular, hollow coupling device with an interior light-reflective surface for receiving light from the source at an inlet and transmitting it to an outlet; the coupling device increasing in cross sectional area from inlet to outlet in such manner as to reduce the angle of light reflected from the surface as it passes through the device; the cross-sectional area of the bulbous region filling the majority of the planar region which is radially bounded by the inlet end of the curved light-reflective surface of the device; and
   c) a thermal-isolating region having an inlet positioned in proximity to an outlet of the coupling device and having an outlet for passing light to an optical member; the thermal-isolating region comprising one or more members;
   d) the coupling device having an inlet with a recess extending in the main direction of light propagation; and
   e) the light source comprising a bulbous region and a projecting member adapted to pass through the recess in such manner that one longitudinal section of the projecting member is at least partially exposed to an outside surface of the coupling device and a substantial part of an adjacent longitudinal section of such member is not exposed to the outside surface, for positioning the light source.

2. The arrangement of claim 1, wherein:
   a) the inlet of the coupling device has a second recess extending in the main direction of light propagation; and
   b) the light source comprises a second projecting member adapted to pass through the second recess in such manner that one longitudinal section of such projecting member is at least partially exposed to an outside surface of the coupling device and a substantial part of an adjacent longitudinal section of such member is not exposed to the outside surface, for positioning the light source.

3. The arrangement of claim 2, further comprising:
   a) a second, generally tubular hollow device with an inlet having a pair of recesses;
   b) the pair of projecting members respectively adapted to pass through the foregoing recesses in such manner that one longitudinal section of each projecting member is at least partially exposed to an outside surface of the coupling device and a substantial part of an adjacent longitudinal section of such member is not exposed to the outside surface, for positioning the light source.

4. The arrangement of claim 1, further comprising a visible light-reflective member disposed about a portion of the bulbous region of the light source for reflecting light into the coupling device.

5. The arrangement of claim 3, wherein the light source comprises an electrodeless lamp.

6. The arrangement of claim 3, wherein the second device comprises an interior light-reflective surface for receiving light from the source at its inlet and transmitting it to an outlet; the second device increasing in cross sectional area from inlet to outlet in such manner as to reduce the angle of light reflected from the surface as it passes through the device.

7. An efficient arrangement for coupling light between a light source and at least one light guide, comprising:
   a) a light source with a bulbous region containing a generally linear light-emitting region;
   b) a generally tubular, hollow coupling device with an interior light-reflective surface for receiving light from the source at an inlet and transmitting it to an outlet; the coupling device increasing in cross sectional area from inlet to outlet in such manner as to reduce the angle of light reflected from the surface as it passes through the device; the cross-sectional area of the bulbous region filling the majority of the planar region which is radially bounded by the inlet end of the curved light-reflective surface of the device; and
   c) a thermal-isolating region having an inlet positioned in proximity to an outlet of the coupling device and having an outlet for passing light to an optical member; the thermal-isolating region comprising one or more members; and
   d) the inlet of the coupling device having a pair of recesses extending in the main direction of light propagation;
   e) the light source comprising a pair of opposite ends respectively adapted to pass through the recesses in such manner that one longitudinal section of each end is at least partially exposed to an outside surface of the coupling device and a substantial part of an adjacent longitudinal section of such end is not exposed to the outside surface;
   f) the recesses being so positioned that the light-emitting region is positioned approximately in a plane of the inlet of the coupling device.

8. The arrangement of claim 7, further comprising:
   a) a second, generally tubular hollow device with an inlet having a pair of recesses extending in the main direction of light propagation; and
   b) the pair of opposite ends of the lamp respectively adapted to pass through the recesses in the second device in such manner that one longitudinal section of each end is at least partially exposed to an outside surface of the second coupling device and a substantial part of an adjacent longitudinal section of such end is not exposed to the outside surface of the second coupling device, for positioning the lamp.

9. The arrangement of claim 7, wherein the maximum dimension of the bulbous region exceeds 85 percent of the maximum dimension of the inlet portion of the coupling device.

10. The arrangement of claim 7, wherein the coupling device is shaped to define a compound parabolic concentrator.

11. The arrangement of claim 7, wherein substantially all cross-sectional segments along the interior of coupling device taken through a central axis of light propagation are substantially parabolic.

12. The arrangement of claim 7, wherein the inlet of the thermal-isolating region is positioned in the immediate vicinity of the outlet of the coupling device.

13. The arrangement of claim 7, wherein the thermal-isolating region comprises one of the group consisting of quartz, glass and ceramic.

14. The arrangement of claim 7, further comprising a visible-light reflecting member on a side of the bulbous region facing away from the coupling device, for reflecting light from the light-emitting region into the coupling device.

15. The arrangement of claim 14, wherein the visible-light reflecting member comprises a coating on the bulbous region.

16. The arrangement of claim 7, further comprising:
a) a second coupling device substantially alike the first-mentioned coupling device; and
b) a second thermal-isolating region substantially alike the first-mentioned thermal-isolating region;
c) the second coupling device and second thermal-isolating region being arranged about the lamp in generally mirror-like fashion to said first-mentioned devices.

17. The arrangement of claim 7, wherein the pair of the opposite ends of the lamp are respectively adapted to pass through the recesses in the second device in such manner that one longitudinal section of each end is at least partially exposed to the outside surface of the second coupling device and a substantial part of an adjacent longitudinal section of such end is not exposed to the outside surface of the second coupling device, for positioning the lamp.

18. The arrangement of claim 17, further comprising:
a) third and fourth coupling devices aligned generally orthogonal and in a symmetrical way with respect to the axis defined by the first-mentioned and second coupling devices;
b) each of the third and fourth coupling devices comprising a generally tubular, hollow coupling device with an interior light-reflective surface for receiving light from the source at an inlet and transmitting it to an outlet; the coupling device increasing in cross sectional area from inlet to outlet in such manner as to reduce the angle of light reflected from the surface as it passes through the device.

19. The arrangement of claim 7, wherein the thermal-isolating region comprises a device separate from the coupling device.

20. The arrangement of claim 7, wherein the light source comprises a halogen, filament-type lamp.

21. An efficient arrangement for coupling light between a light source and at least one light guide, comprising:
a) light source with a bulbous region containing a generally linear light-emitting region;
b) a generally tubular, hollow coupling device with an interior light-reflective surface for receiving light from the source at an inlet and transmitting it to an outlet; the coupling device increasing in cross sectional area from inlet to outlet in such manner as to reduce the angle of light reflected from the surface as it passes through the device; the cross-sectional area of the bulbous region filling the majority of the planar region which is radially bounded by the inlet end of the curved light-reflective surface of the device;
c) the light source comprising a pair of in-leads projecting from opposite ends of the light source;
d) the entire portions of the in-leads exposed to the inlet of the coupling device being encapsulated in material of the light source;
e) a thermal-isolating region having an inlet positioned in proximity to an outlet of the coupling device and having an outlet for passing light to an optical member; the thermal-isolating region comprising one or more members; and f) the tubular coupling device having a cross section transverse to the direction of light propagation that more closely conforms to the shape of the bulbous region than a circular cross section and that is shaped to be substantially more curved than generally rectangular, with the light-emitting region being generally parallel to the maximum dimension of such cross section.

22. The arrangement of claim 21, wherein the cross section is oblong.

23. The arrangement of claim 21, wherein the cross section comprises a clamshell shape formed by joining two circular arcs of substantially the same radius, each arc being substantially less than 180 degrees.

24. The arrangement of claim 23, wherein both arcs have substantially the same degrees.

25. The arrangement of claim 21, wherein the largest dimension of the input of the thermal-isolating region is greater than about 50% of the largest dimension of the outlet of the coupling device.

26. The arrangement of claim 21, wherein substantially all cross sections along the interior of coupling device taken through the central axis of light propagation are substantially parabolic.

27. The arrangement of claim 21, wherein the inlet of the thermal-isolating region is positioned in the immediate vicinity of the outlet of the coupling device.

28. The arrangement of claim 21, wherein the thermal-isolating region comprises one of the group consisting of quartz, glass and ceramic.

29. The arrangement of claim 21, further comprising a visible-light reflecting member on a side of the arc facing away from the coupling device, for reflecting light from the arc into the coupling device.

30. The arrangement of claim 29, wherein the visible-light reflecting member comprises a coating on the arc tube.

31. The arrangement of claim 21, further comprising:
a) a second coupling device comprising a generally tubular, hollow coupling device with an interior light-reflective surface for receiving light from the source at an inlet and transmitting it to an outlet; the coupling device increasing in cross sectional area from inlet to outlet in such manner as to reduce the angle of light reflected from the surface as it passes through the device; and
b) a second thermal-isolating having an inlet positioned in proximity to an outlet of the second coupling device and having an outlet for passing light to an optical member; the thermal-isolating region comprising one or more members;
c) the second coupling device and second thermal-isolating region being respectively arranged in generally minor-like fashion about the lamp to said first-mentioned coupling device and said first-mentioned thermal-isolating region.

32. The arrangement of claim 21, wherein the thermal-isolating region comprises a device separate from the coupling device.

33. The arrangement of claim 21, wherein the light source comprises a halogen, filament-type lamp.

34. An efficient arrangement for coupling light between a light source and at least one light guide, comprising:
a) a light source with a bulbous region containing a generally linear light-emitting region;
b) a generally tubular, hollow coupling device with an interior light-reflective surface for receiving light from the source at an inlet and transmitting it to an outlet; the coupling device increasing in cross sectional area from inlet to outlet in such manner as to reduce the angle of light reflected from the surface as it passes through the device; the cross-sectional area of the bulbous region filling the majority of the planar region which is radially bounded by the inlet end of the curved light-reflective surface of the device; and c) a thermal-isolating region having an inlet positioned in proximity to an outlet of the coupling device and having an outlet for passing light to an optical member; the thermal-isolating region comprising one or more members;

d) the inlet of the coupling device having a pair of recesses extending in the main direction of light propagation for receiving opposite ends of the lamp;

e) the light source comprising a pair of opposite ends respectively adapted to pass through the recesses in such manner that one longitudinal section of each end is at least partially exposed to an outside surface of the coupling device and a substantial part of an adjacent longitudinal section is not exposed to the outside surface and in such manner that the light-emitting region is positioned approximately in a plane of the inlet of the coupling device; and f) the tubular coupling device having a cross section transverse to the direction of light propagation that more closely conforms to the shape of the bulbous region than a circular cross section and that is shaped to be substantially more curved than generally rectangular, with the light-emitting region being generally parallel to the maximum dimension of such cross section.

35. The arrangement of claim 34, further comprising:

a) a second, generally tubular hollow device with an inlet having a pair of recesses extending in the main direction of light propagation; and b) the pair of opposite ends of the lamp respectively adapted to pass through the recesses in the second device in such manner that one longitudinal section of each end is at least partially exposed to an outside surface of the second coupling device and a substantial part of an adjacent longitudinal section of such end is not exposed to the outside surface of the second coupling device, for positioning the lamp.

36. The arrangement of claim 34, wherein the light source comprises a halogen, filament-type lamp.

37. The arrangement of claim 34, wherein the cross section comprises a clamshell shape formed by joining two circular arcs of substantially the same radius, each arc being substantially less than 180 degrees.

38. An efficient arrangement for coupling light between a light source and at least one light guide, comprising:

a) a light source having a bulbous region and electrical in-leads extending into the bulbous region;

b) a generally tubular, hollow coupling device with an interior light-reflective surface for receiving light from the source at an inlet and transmitting it to an outlet; the coupling device increasing in cross sectional area from inlet to outlet in such manner as to reduce the angle of light reflected from the surface as it passes through the device; the cross-sectional area of the bulbous region filling the majority of the planar region which is radially bounded by the inlet end of the curved light-reflective surface of the device; and c) a thermal-isolating region having an inlet positioned in proximity to an outlet of the coupling device and having an outlet for passing light to an optical member; the thermal-isolating region comprising one or more members.

39. The arrangement of claim 7, wherein:

a) the light source comprises a pair of in-leads projecting from opposite ends of the light source;

the entire portions of the in-leads between the pair of recesses being encapsulated in material of the light source.

40. The arrangement of claim 1, wherein substantially all cross-sectional segments along the interior of coupling device taken through a central axis of light propagation are substantially concave.

41. The arrangement of claim 21, wherein substantially all cross-sectional segments along the interior of coupling device taken through a central axis of light propagation are substantially concave.

42. The arrangement of claim 38, wherein substantially all cross-sectional segments along the interior of coupling device taken through a central axis of light propagation are substantially concave.

43. The arrangement of claim 1, wherein the coupling device comprises quartz, ceramic or high-temperature borosilicate glass.

44. The arrangement of claim 1, wherein the light-reflective surface comprises a multi-layer optical interference coating.

45. The arrangement of claim 21, wherein the coupling device comprises quartz, ceramic or high-temperature borosilicate glass.

46. The arrangement of claim 21, wherein the light-reflective surface comprises a multi-layer optical interference coating.

47. The arrangement of claim 38, wherein the coupling device comprises quartz, ceramic or high-temperature borosilicate glass.

48. The arrangement of claim 38, wherein the light-reflective surface comprises a multi-layer optical interference coating.

* * * * *